(12) United States Patent
Zhang (10) Patent No.: US 11,631,981 B2
(45) Date of Patent: *Apr. 18, 2023

(54) POWER ADAPTER, TERMINAL, AND METHOD FOR PROCESSING IMPEDANCE ANOMALIES IN CHARGING LOOP

(71) Applicant: GUANGDONG OPPO MOBILE TELECOMMUNICATIONS CORP., LTD., Guangdong (CN)

(72) Inventor: Jialiang Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 404 days.

This patent is subject to a terminal disclaimer.

(21) Appl. No.: 16/397,991

(22) Filed: Apr. 29, 2019

(65) Prior Publication Data

US 2019/0260211 A1 Aug. 22, 2019

Related U.S. Application Data

(63) Continuation of application No. 15/115,052, filed as application No. PCT/CN2015/070460 on Jan. 9, 2015, now Pat. No. 10,320,206.

(30) Foreign Application Priority Data

Jan. 28, 2014 (CN) .......................... 201410042716.8
Jan. 28, 2014 (CN) .......................... 201410043148.3

(51) Int. Cl.
*H02J 7/00* (2006.01)
*H02J 7/02* (2016.01)
*H01R 31/06* (2006.01)

(52) U.S. Cl.
CPC ............ *H02J 7/0029* (2013.01); *H01R 31/06* (2013.01); *H02J 7/00036* (2020.01);
(Continued)

(58) Field of Classification Search
CPC .... H02J 7/0029; H02J 7/00036; H02J 7/0069; H02J 7/007; H02J 7/02; H02J 7/00034;
(Continued)

(56) References Cited

U.S. PATENT DOCUMENTS 4,207,611 A 6/1980 Gordon
6,829,726 B1 12/2004 Korhonen
(Continued)

FOREIGN PATENT DOCUMENTS

CN 1134620 A 10/1996
CN 2678222 Y 2/2005
(Continued)

OTHER PUBLICATIONS

PCT/CN2015/070461 International Search Report and Written Opinion dated Mar. 27, 2015, 13 pages.
(Continued)

*Primary Examiner* — Arun C Williams
(74) *Attorney, Agent, or Firm* — Lathrop GPM LLP (57) ABSTRACT

A power adapter, a terminal, and a method for processing an impedance anomaly in a charging loop are provided. The terminal includes a battery and a charging interface, and is configured to form a charging loop with a power adapter via the charging interface to charge the battery. The terminal further includes: a communication component, configured to receive voltage indication information from the power adapter when the power adapter charges the terminal, the voltage indication information indicating an output voltage of the power adapter; a detection component, configured to detect an input voltage of the power adapter; and an anomaly processing component, configured to determine whether an impedance of the charging loop is abnormal according to a difference between the input voltage and the output voltage,
(Continued)

and to control the charging loop to enter into a protected state if the impedance of the charging loop is abnormal.

20 Claims, 3 Drawing Sheets

(52) U.S. Cl.
CPC ........ *H02J 7/0047* (2013.01); *H02J 7/00047* (2020.01); *H02J 7/0069* (2020.01); *H02J 7/02* (2013.01); *H02J 7/00034* (2020.01)

(58) Field of Classification Search
CPC .. H02J 7/0047; H02J 7/00714; H02J 7/00712; H02J 7/00716; H02J 7/00718; H02J 7/007182; H02J 7/007184; H02J 7/007186; H01R 31/06
USPC .......................................................... 320/107
See application file for complete search history.

(56) References Cited

U.S. PATENT DOCUMENTS

| | | | |
|---|---|---|---|
| 7,012,405 B2 | 3/2006 | Nishida et al. | |
| 7,376,846 B2 | 5/2008 | Hawkins et al. | |
| 7,459,884 B2 | 12/2008 | Sasaki et al. | |
| 9,379,558 B2 | 6/2016 | Seethaler | |
| 10,320,206 B2* | 6/2019 | Zhang | H02J 7/0069 |
| 2002/0169915 A1 | 11/2002 | Wu | |
| 2002/0190755 A1 | 12/2002 | Lee | |
| 2004/0090209 A1 | 5/2004 | Nishida | |
| 2004/0100271 A1 | 5/2004 | Ikeda | |
| 2004/0164714 A1 | 8/2004 | Hayashi | |
| 2005/0174094 A1* | 8/2005 | Purdy | H02J 7/00 320/134 |
| 2006/0132087 A1 | 6/2006 | Chen et al. | |
| 2006/0284595 A1 | 12/2006 | Hsieh et al. | |
| 2008/0048621 A1 | 2/2008 | Yun | |
| 2008/0315846 A1 | 12/2008 | Sato et al. | |
| 2009/0261786 A1* | 10/2009 | Hsu | H02J 7/0072 320/162 |
| 2010/0141266 A1 | 6/2010 | Cui et al. | |
| 2011/0055407 A1 | 3/2011 | Lydon et al. | |
| 2011/0248670 A1 | 10/2011 | Yamazaki et al. | |
| 2011/0266874 A1 | 11/2011 | Soemantri et al. | |
| 2012/0098495 A1 | 4/2012 | Yang | |
| 2012/0137026 A1 | 5/2012 | Shen | |
| 2012/0253717 A1* | 10/2012 | Ito | G01R 31/396 702/63 |
| 2013/0175978 A1 | 7/2013 | Hsiao | |
| 2013/0229186 A1* | 9/2013 | Shiraishi | H02J 7/0031 324/415 |
| 2015/0022154 A1* | 1/2015 | Kim | H02J 7/342 320/114 |
| 2015/0137789 A1 | 5/2015 | Furtner | |
| 2015/0180244 A1 | 6/2015 | Jung et al. | |
| 2016/0352132 A1 | 12/2016 | Zhang et al. | |

FOREIGN PATENT DOCUMENTS

| | | | |
|---|---|---|---|
| CN | 1691451 A | 11/2005 | |
| CN | 1989675 A | 6/2007 | |
| CN | 2935489 Y | 8/2007 | |
| CN | 101013764 A | 8/2007 | |
| CN | 101102119 A | 1/2008 | |
| CN | 101106283 A | 1/2008 | |
| CN | 101123365 A | 2/2008 | |
| CN | 101299544 A | 11/2008 | |
| CN | 101363895 A | 2/2009 | |
| CN | 201335870 Y | 10/2009 | |
| CN | 101908771 A | 12/2010 | |
| CN | 101938160 A | 1/2011 | |
| CN | 201754426 U | 3/2011 | |
| CN | 201837695 U | 5/2011 | |
| CN | 102082310 A | 6/2011 | |
| CN | 201858546 U | 6/2011 | |
| CN | 102122739 A | 7/2011 | |
| CN | 201975834 U | 9/2011 | |
| CN | 102395892 A | 3/2012 | |
| CN | 102479137 A | 5/2012 | |
| CN | 102508096 A | 6/2012 | |
| CN | 102593795 A | 7/2012 | |
| CN | 101123365 B | 9/2012 | |
| CN | 202435073 U | 9/2012 | |
| CN | 102868820 A | 1/2013 | |
| CN | 102931709 A | 2/2013 | |
| CN | 103135018 A | 6/2013 | |
| CN | 103226183 A | 7/2013 | |
| CN | 103236568 A | 8/2013 | |
| CN | 103257699 A | 8/2013 | |
| CN | 103269097 A | 8/2013 | |
| CN | 103399251 A | 11/2013 | |
| CN | 203398103 U | 1/2014 | |
| CN | 203398750 U | 1/2014 | |
| CN | 203490636 U | 3/2014 | |
| CN | 103762702 A | 4/2014 | |
| CN | 203747451 U | 7/2014 | |
| CN | 203747454 U | 7/2014 | |
| CN | 204179074 U | 2/2015 | |
| CN | 104393627 A | 3/2015 | |
| CN | 204422727 U | 6/2015 | |
| CN | 105021998 A | 11/2015 | |
| CN | 106463991 A | 2/2017 | |
| EP | 1796243 A2 * | 6/2007 | ............... H02J 7/04 |
| EP | 2278668 A2 | 1/2011 | |
| EP | 3101758 A1 | 12/2016 | |
| JP | H08237949 A | 9/1996 | |
| JP | H09168241 A | 6/1997 | |
| JP | 2001180083 A | 7/2001 | |
| JP | 2003092841 A | 3/2003 | |
| JP | 2007327772 A | 12/2007 | |
| JP | 2007327772 A * | 12/2007 | |
| JP | 2008005593 A | 1/2008 | |
| JP | 2008035674 A | 2/2008 | |
| JP | 2009057187 A | 3/2009 | |
| JP | 2009225493 A | 10/2009 | |
| JP | 2010220299 A | 9/2010 | |
| JP | 2011015581 A | 1/2011 | |
| JP | 4960022 B2 | 6/2012 | |
| JP | 2012151946 A | 8/2012 | |
| JP | 2013025345 A | 2/2013 | |
| JP | 2013125745 A | 6/2013 | |
| JP | 2013153595 A | 8/2013 | |
| JP | 2015012710 A | 1/2015 | |
| WO | WO 2012144032 A1 | 10/2012 | |
| WO | WO 2015113349 A1 | 8/2015 | |

OTHER PUBLICATIONS

PCT/CN2015/070461 English translation of International Search Report and Written Opinion dated Mar. 27, 2015, 12 pages.
PCT/CN2016/083691 International Search Report and Written Opinion, dated Mar. 7, 2017, 6 pages.
PCT/CN2016/083691 English translation of International Search Report and Written Opinion, dated Mar. 7, 2017, 6 pages.
PCT/CN2016/083692 International Search Report and Written Opinion, dated Mar. 7, 2017, 7 pages.
PCT/CN2016/083692 English translation of International Search Report and Written Opinion, dated Mar. 7, 2017, 6 pages.
PCT/CN2016/083693 International Search Report and Written Opinion, dated Mar. 2, 2017, 7 pages.
PCT/CN2016/083693 English translation of International Search Report and Written Opinion, dated Mar. 2, 2017, 7 pages.
PCT/CN2016/083694 International Search Report and Written Opinion, dated Feb. 16, 2017, 7 pages.
PCT/CN2016/083695 International Search Report and Written Opinion, dated Feb. 22, 2017, 7 pages.
PCT/CN2016/083695 English translation of International Search Report and Written Opinion, dated Feb. 22, 2017, 7 pages.
PCT/CN2016/083696 International Search Report and Written Opinion, dated Feb. 17, 2017, 7 pages.

(56) References Cited

OTHER PUBLICATIONS

PCT/CN2016/083696 English translation of International Search Report and Written Opinion, dated Feb. 17, 2017, 7 pages.
European Patent Application No. 15742934.1 extended Search and Opinion dated Sep. 29, 2017, 9 pages.
Japanese Patent Application No. 2016-549514 Office Action dated Sep. 26, 2017, 5 pages.
Japanese Patent Application No. 2016-549514 English translation of Office Action dated Sep. 26, 2017, 4 pages.
Australian Patent Application No. 2015210565, Office Action dated May 10, 2017, 3 pages.
Japanese Patent Application No. 2016-549514 Second Office Action dated Apr. 10, 2018, 7 pages.
Japanese Patent Application No. 2016-549514 English translation of Second Office Action dated Apr. 10, 2018, 6 pages.
Australian Patent Application No. 2014381139 Office Action dated Jul. 26, 2017, 3 pages.
Canadian Patent Application No. 2938139 First Office Action dated May 24, 2017, 8 pages.
Canadian Patent Application No. 2938139 Office Second Action dated Feb. 15, 2018, 5 pages.
Chilean Patent Application No. 201601916, Office Action dated Sep. 21,2017, 6 pages.
Chilean Patent Application No. 201601916 Second Office Action dated Mar. 2, 2018, 7 pages.
Japanese Patent Application No. 2016549035 Office Action dated Jun. 27, 2017, 4 pages.
Japanese Patent Application No. 2016549035 English translation of Office Action dated Jun. 27, 2017, 3 pages.
Japanese Patent Application No. 2017212198 Office Action dated Dec. 12, 2017, 2 pages.
Japanese Patent Application No. 2017212198 English translation of Office Action dated Dec. 12, 2017, 2 pages.
Chinese Patent Application No. 201410042716.8 Office Action dated Jun. 20, 2016, 4 pages.
Chinese Patent Application No. 201410042716.8 English translation of Office Action dated Jun. 20, 2016, 6 pages.
Chinese Patent Application No. 201410043148.3 Office Action dated Apr. 26, 2018, 5 pages.
Chinese Patent Application No. 201410043148.3 English translation of Office Action dated Apr. 26, 2018, 9 pages.
U.S. Appl. No. 15/114,966 Office Action dated Dec. 29, 2017, 11 pages.
U.S. Appl. No. 15/596,884 Office Action dated Jun. 28, 2017, 42 pages.
U.S. Appl. No. 15/596,884 Office Action dated Oct. 5, 2017, 38 pages.
U.S. Appl. No. 15/596,884 Office Action dated Feb. 23, 2018, 34 pages.
U.S. Appl. No. 15/115,203 Office Action dated May 16, 2018, 25 pages.
European Patent Application No. 14880785.2 extended Search and Opinion dated Oct. 10, 2017, 5 pages.
European Patent Application No. 14881067.4 extended Search and Opinion dated Oct. 19, 2017, 13 pages.
Singapore Patent Application No. 11201606227T Search Report and Opinion dated Jun. 27, 2017, 9 pages.
PCT/CN2014/077046 International Search Report dated Oct. 9, 2014, 5 pages.
PCT/CN2014/077046 English translation of International Search Report dated Oct. 9, 2014, 3 pages.
Chinese Patent Application No. 201810719971.X, Decision on Rejection dated Oct. 26, 2022, 17 pages.
Chinese Patent Application No. 201810719971.X, English translation of Decision on Rejection dated Oct. 26, 2022, 32 pages.
Chinese Patent Application No. 201910579473.4, Office Action dated Nov. 21, 2022, 13 pages.
Chinese Patent Application No. 201910579473.4, English translation of Office Action dated Nov. 21, 2022, 13 pages.

* cited by examiner

POWER ADAPTER, TERMINAL, AND METHOD FOR PROCESSING IMPEDANCE ANOMALIES IN CHARGING LOOP

CROSS-REFERENCE TO RELATED APPLICATIONS

This application is a continuation application of U.S. application Ser. No. 15/115,052, filed Jul. 28, 2016, which is a US national phase application based on International Application No. PCT/CN2015/070460, filed on Jan. 9, 2015, which is based on and claims priority to Chinese Patent Application No. 201410043148.3, filed on Jan. 28, 2014; No. 201410042716.8, filed on Jan. 28, 2014, the entire contents of which are incorporated herein by reference.

TECHNICAL FIELD

Embodiments of the present disclosure relate to the charging technical field, and more particularly, to a power adapter, a terminal and a method for processing an impedance anomaly of a charging loop.

BACKGROUND

Currently, batteries in most of electronic devices are coupled to external power adapters via charging interfaces of the electronic devices to be charged.

Phenomenon of an impedance anomaly of a charging loop often occurs during charging. There are various reasons resulting in the impedance anomaly, for example, a poor contact caused by not well inserting the charging interface, and a poor contact between a battery and a connector at each terminal of the battery due to dirt at the two terminals of the battery.

In a case that the impedance anomaly of the charging loop occurs, if the charging goes on, charging components (such as a battery, a power adapter, and a terminal) will be damaged, so that there are security risks. In the related art, the impedance anomaly of the charging loop cannot be detected and processed, so that the security during charging is poor.

SUMMARY

Embodiments of the present disclosure provide a power adapter, a terminal and a method for processing an impedance anomaly of a charging loop, so as to improve the security during charging.

In an embodiment, a terminal is provided. The terminal includes a battery and a charging interface, and is configured to form a charging loop with a power adapter via the charging interface to charge the battery. The terminal further includes: a communication component, configured to receive voltage indication information from the power adapter when the power adapter charges the terminal, in which the voltage indication information indicates an output voltage of the power adapter; a detection component, configured to detect an input voltage of the power adapter; and an anomaly processing component, configured to determine whether an impedance of the charging loop is abnormal according to a difference between the input voltage and the output voltage, and to control the charging loop to enter into a protected state if the impedance of the charging loop is abnormal.

In an embodiment, a power adapter is provided. The power adapter includes a power conversion component and a charging interface, and the power conversion component is configured to form a charging loop with a terminal via the charging interface to charge a battery of the terminal. The power adapter further includes: a detection component, a communication component and an anomaly processing component, in which, the detection component is configured to detect an output voltage of the power adapter when the power adapter charges the terminal; the communication component is configured to send voltage indication information to the terminal, the voltage indication information indicating the output voltage of the power adapter detected by the detection component; the communication component is configured to receive charging protection indication information from the terminal if the terminal determines that an impedance of the charging loop is abnormal based on a difference between an input voltage of the power adapter and the output voltage of the power adapter; and the anomaly processing component is configured to control the charging loop to enter into a protected state according to an indication of the charging protection indication information.

In an embodiment, a method for processing an impedance anomaly of a charging loop is provided. The method includes: receiving, by a terminal, voltage indication information from a power adapter when the power adapter charges the terminal, the voltage indication information indicating an output voltage of the power adapter; detecting, by a terminal, an input voltage of the power adapter; and determining, by a terminal, whether an impedance of the charging loop is abnormal according to a difference between the input voltage and the output voltage and controlling, by the terminal, the charging loop to enter into a protected state if the impedance of the charging loop is abnormal.

In an embodiment, a method for processing an impedance anomaly of a charging loop is provided. The method includes: detecting, by the power adapter, an output voltage of the power adapter when the power adapter charges the terminal; sending, by the power adapter, voltage indication information to the terminal, the voltage indication information indicating the output voltage of the power adapter detected by the power adapter; receiving, by the power adapter, charging protection indication information from the terminal if the terminal determines that an impedance of the charging loop is abnormal based on a difference between an input voltage of the power adapter and the output voltage of the power adapter; and controlling, by the power adapter, the charging loop to enter into a protected state according to an indication of the charging protection indication information.

BRIEF DESCRIPTION OF THE DRAWINGS

In order to make the technical solutions of embodiments of the present disclosure more clearly, the accompanying drawings used in the description of embodiments of the present disclosure are briefly described hereunder. Obviously, the described drawings are merely some embodiments of present disclosure. For persons skilled in the art, other drawings may be obtained based on these drawings without any creative work.

DETAILED DESCRIPTION

The technical solutions in embodiments of the present disclosure are hereinafter described clearly and completely with reference to the accompanying drawings in embodiments of the present disclosure. It should be understood that, embodiments described herein are a part of embodiments of the present disclosure, but not all. Based on embodiments of the present disclosure, all other embodiments obtained by those skilled in the art without creative work should fall within the scope of the present disclosure.

Figure 1:
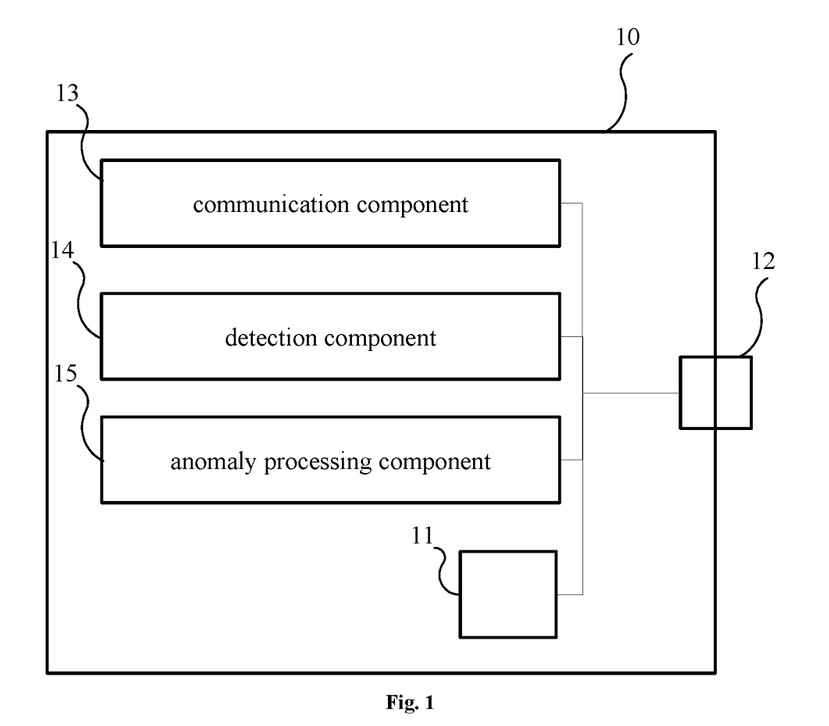
FIG. 1 is a schematic block diagram showing a terminal according to an embodiment of the present disclosure.

FIG. 1 is a schematic block diagram showing a terminal according to an embodiment of the present disclosure. The terminal 10 in FIG. 1 includes a battery 11 and a charging interface 12. The terminal 10 forms a charging loop with a power adapter via the charging interface 12 to charge the battery 11. The terminal 10 further includes: a communication component 13, a detection component 14 and an anomaly processing component 15.

The communication component 13 is configured to receive voltage indication information from the power adapter when the power adapter charges the terminal, in which the voltage indication information indicates an output voltage of the power adapter detected by the terminal.

The detection component 14 is configured to detect an input voltage of the power adapter.

The anomaly processing component 15 is configured to determine whether an impedance of the charging loop is abnormal according to a difference between the input voltage and the output voltage, and to control the charging loop to enter into a protected state if the impedance of the charging loop is abnormal.

In embodiments of the present disclosure, the terminal obtains the output voltage of the power adapter via the communication with the power adapter. The terminal determines whether the impedance of the charging loop is abnormal according to the difference between the output voltage of the power adapter and the input voltage of the power adapter detected by itself, and controls the charging loop to enter into the protected state if the impedance of the charging loop is abnormal, thereby improving the security during charging.

In at least one embodiment, the anomaly processing component 15 is configured to control the charging loop to enter into the protected state by performing one or more of following operations of: reducing the input voltage of the power adapter; reducing an input current of the power adapter; and switching off the charging loop.

In an embodiment, the anomaly processing component 15 is configured to determine whether the impedance of the charging loop is abnormal according to the difference between the input voltage and the output voltage and to control the charging loop to enter into the protected state if the impedance of the charging loop is abnormal by performing following operations of: determining a level of the impedance according to the difference between the input voltage and the output voltage of the power adapter; and controlling the charging loop to enter into a protected state corresponding to the level according to the level of the impedance.

For example, a correspondence between a level of the impedance and a difference between the input voltage and the output voltage of the power adapter may be set in advance. After the anomaly processing component 15 determines an actual difference between the input voltage of the power adapter and the output voltage of the power adapter, a level of the impedance corresponding to the actual difference may be found by using the above correspondence. Different levels of the impedance correspond to different protected states respectively. For example, the levels of the impedance include "light", "medium" and "heavy". If the level of the impedance is "light", it can control the charging loop to continue charging with a large current; if the level of the impedance is "medium", it can control the charging loop to charge with a small current; and if the level of the impedance is "heavy", it can control the charging loop to be switched off.

In at least one embodiment, a position where the output voltage of the power adapter is detected and a position where the input voltage of the power adapter is detected by the terminal are not be limited in embodiments of the present disclosure, and can be set according to different requirements.

For example, detection positions of the input voltage of the power adapter and the output voltage of the power adapter are located at two terminals of the charging interface respectively, and the impedance of the charging loop refers to an impedance of a circuit in the charging interface. The above detection positions of the input voltage of the power adapter and the output voltage of the power adapter being located respectively at two terminals of the charging interface refers to that, the position where the power adapter detects the output voltage and the position where the terminal detects the input voltage of the power adapter are close to the charging interface coupled to the power adapter and the terminal. If any of the power adapter and the terminal detects that a drop of voltage is abnormal, it may be determined that it is caused by an impedance anomaly of the circuit in the charging interface.

For another example, a detection position of the input voltage of the power adapter is located at two terminals of the battery, and the impedance of the charging loop refers to an impedance of a circuit from the power adapter to the battery of the terminal. Since the input current of the power adapter flows through each component within the terminal and reaches the two terminals of the battery eventually, the difference between the input voltage and the output voltage of the power adapter can indicate the impedance of the whole charging loop if the terminal detects the input voltage of the power adapter at the two terminals of the battery.

In an embodiment, the terminal 10 further includes an alarm device configured to generate an alarm signal if the impedance of the charging loop is abnormal. The alarm device can be a sound alarm device, or a lamp. Taking the impedance of the charging loop being the impedance of the circuit in the charging interface as an example, when the alarm device raises an alarm, it indicates that the charging interface contacts poorly and reminds a user to re-couple the charging interface between the power adapter and the terminal.

In an embodiment, the communication component 13 sends charging protection indication information to the power adapter if the impedance of the charging loop is abnormal, so as to instruct the power adapter to control the charging loop to enter into the protected state.

In embodiments of the present disclosure, if the impedance of the charging loop is abnormal, the terminal not only controls the charging loop to enter into the protected state actively, but also instructs the power adapter to control the charging loop to enter into the protected state. In this way, even if the anomaly processing component of the terminal is invalid and cannot control the charging loop to enter into the protected state, the charging loop still can be controlled by the power adapter to enter into the protected state, thereby further improving the security during charging.

In an embodiment, the charging interface 12 includes a power wire and a data wire. The terminal 10 is configured to form the charging loop with the power adapter via the power wire in the charging interface 12 to charge the battery 11; the communication component 13 is configured to receive the voltage indication information from the power adapter via the data wire in the charging interface 12 when the power adapter charges the terminal 10.

For example, the charging interface may be a Universal Serial Bus (USB) interface or a micro USB interface. The above power wire may be a power wire in the USB interface, for example, +5V power wire and −5V power wire; the above data wire may be a data wire in the USB interface, for example, D+ wire and D− wire.

Figure 2:
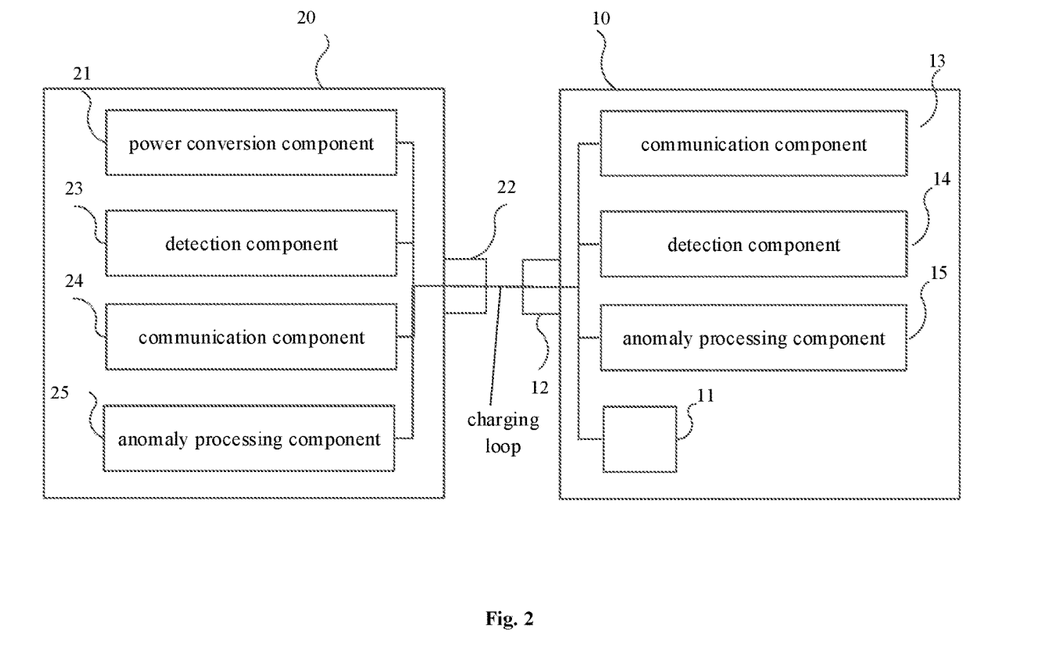
FIG. 2 is a schematic block diagram showing a power adapter according to an embodiment of the present disclosure.

FIG. 2 is a schematic block diagram showing a power adapter according to an embodiment of the present disclosure. The power adapter 20 in FIG. 2 includes a power conversion component 21 and a charging interface 22. The power conversion component 21 is configured to form a charging loop with a terminal via the charging interface 22 to charge a battery of the terminal. The power adapter 20 further includes: a detection component 23, a communication component 24 and an anomaly processing component 25.

The detection component 23 is configured to detect an output voltage of the power adapter when the power adapter 20 charges the terminal.

The communication component 24 is configured to send voltage indication information to the terminal, in which the voltage indication information indicates the output voltage of the power adapter detected by the detection component 23.

The communication component 24 is configured to receive charging protection indication information from the terminal if the terminal determines that an impedance of the charging loop is abnormal based on a difference between an input voltage of the power adapter 20 and the output voltage of the power adapter 20.

The anomaly processing component 25 is configured to control the charging loop to enter into a protected state according to an indication of the charging protection indication information.

In embodiments of the present disclosure, the power adapter communicates with the terminal during charging, and sends the output voltage of the power adapter detected by itself to the terminal, so that the terminal determines whether the impendence of the charging loop is abnormal according to the difference between the output voltage of the power adapter and the input voltage of the power adapter detected by itself. If the impendence of the charging loop is abnormal, the power adapter receives the charging protection indication information from the terminal and then controls the charging loop to enter into the protected state, thereby improving the security during charging.

In an embodiment, the charging interface 22 includes a power wire and a data wire. The power conversion component 21 is configured to form the charging loop with the terminal via the power wire in the charging interface 22 to charge the battery of the terminal; the communication component 24 is configured to send the voltage indication information to the terminal via the data wire in the charging interface 22.

For example, the charging interface may be a Universal Serial Bus (USB) interface or a micro USB interface. The above power wire may be a power wire in the USB interface, for example, +5V power wire and −5V power wire; the above data wire may be a data wire in the USB interface, for example, D+ wire and D− wire.

In at least one embodiment, a position where the power adapter detects the output voltage thereof and a position where the terminal detects the input voltage of the power adapter are not be limited in embodiments of the present disclosure, and may be set according to different requirements.

For example, detection positions of the input voltage of the power adapter and the output voltage of the power adapter are located at two terminals of the charging interface respectively, and the impedance of the charging loop refers to an impedance of a circuit in the charging interface. The above detection positions of the input voltage of the power adapter and the output voltage of the power adapter being located respectively at two terminals of the charging interface refers to that, the position where the power adapter detects the output voltage and the position where the terminal detects the input voltage of the power adapter are close to the charging interface coupled to the power adapter and the terminal. If any of the power adapter and the terminal detects that a drop of voltage is abnormal, it may be determined that it is caused by an impedance anomaly of the circuit in the charging interface.

For another example, a detection position of the input voltage of the power adapter is located at two terminals of the battery, and the impedance of the charging loop refers to an impedance of a circuit from the power adapter to the battery of the terminal. Since the input current of the power adapter flows through each component within the terminal and reaches the two terminals of the battery eventually, the difference between the input voltage and the output voltage of the power adapter may indicate whether the impedance of the whole charging loop is abnormal, if the terminal detects the input voltage of the power adapter at the two terminals of the battery.

In an embodiment, the power adapter 20 further includes an alarm device configured to generate an alarm signal if the impedance of the charging loop is abnormal. The alarm device can be a sound alarm device, or a lamp. Taking the impedance of the charging loop being the impedance of the circuit in the charging interface as an example, when the alarm device raises an alarm, it indicates that the charging interface has a poor contact and reminds a user to re-couple the charging interface between the power adapter and the terminal.

Figure 3:
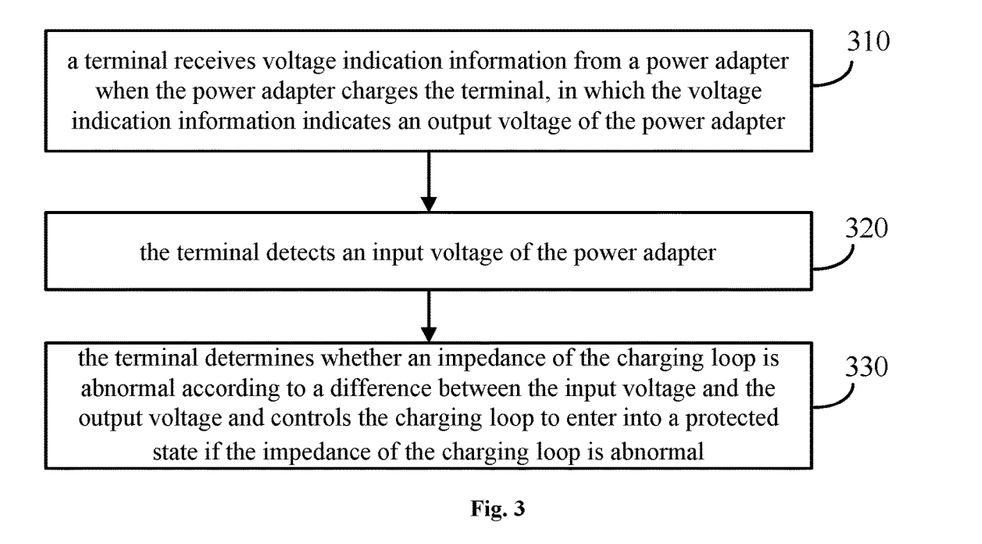
FIG. 3 is a schematic flow chart showing a method for processing an impedance anomaly of a charging loop according to an embodiment of the present disclosure.

FIG. 3 is a schematic flow chart showing a method for processing an impedance anomaly of a charging loop according to an embodiment of the present disclosure. In at least one embodiment, the method in FIG. 3 may be performed by the terminal shown in FIG. 1, which is not described in detail here to avoid duplication. The method in FIG. 3 includes the following.

In block 310, a terminal receives voltage indication information from a power adapter when the power adapter charges the terminal, in which the voltage indication information indicates an output voltage of the power adapter.

In block 320, the terminal detects an input voltage of the power adapter.

In block 330, the terminal determines whether an impedance of the charging loop is abnormal according to a difference between the input voltage and the output voltage and controls the charging loop to enter into a protected state if the impedance of the charging loop is abnormal.

In embodiments of the present disclosure, the terminal obtains the output voltage of the power adapter via the communication with the power adapter. The terminal determines whether the impedance of the charging loop is abnormal according to the difference between the output voltage of the power adapter and the input voltage of the power adapter detected by itself, and controls the charging loop to enter into the protected state if the impedance of the charging loop is abnormal, thereby improving the security during charging.

In an embodiment, the terminal determining whether the impedance of the charging loop is abnormal according to the difference between the input voltage and the output voltage and controlling the charging loop to enter into the protected state if the impedance of the charging loop is abnormal includes: the terminal determining a level of the impedance according to the difference; and the terminal controlling the charging loop to enter into a protected state corresponding to the level according to the level of the impedance.

In an embodiment, detection positions of the input voltage of the power adapter and the output voltage of the power adapter are located at two terminals of a charging interface respectively, and the impedance of the charging loop refers to an impedance of a circuit in the charging interface.

In an embodiment, a detection position of the input voltage of the power adapter is located at two terminals of a battery of the terminal, and the impedance of the charging loop refers to an impedance of a circuit from the power adapter to the battery of the terminal.

In an embodiment, the method in FIG. 3 further includes: generating by the terminal an alarm signal if the impedance of the charging loop is abnormal.

In an embodiment, the method in FIG. 3 further includes: sending by the terminal charging protection indication information to the power adapter if the impedance of the charging loop is abnormal, so as to instruct the power adapter to control the charging loop to enter into the protected state.

In an embodiment, the charging interface includes a power wire and a data wire, the power adapter charges the terminal via the power wire, the terminal receiving the voltage indication information from the power adapter includes: the terminal receiving the voltage indication information from the power adapter via the data wire in the charging interface.

Figure 4:
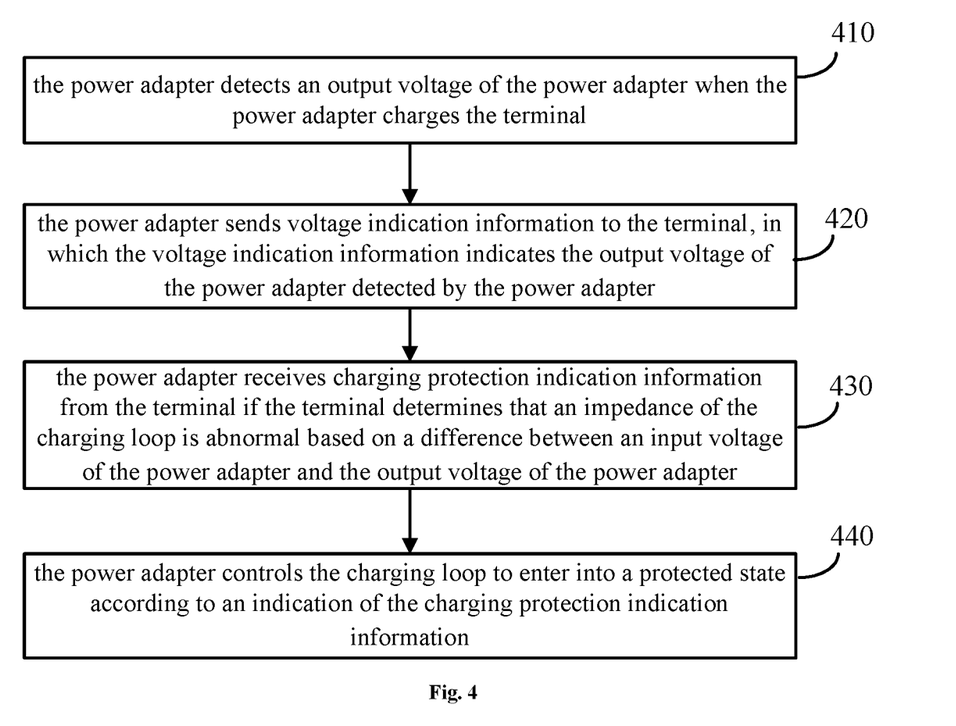
FIG. 4 is a schematic flow chart showing a method for processing an impedance anomaly of a charging loop according to an embodiment of the present disclosure.

FIG. 4 is a schematic flow chart showing a method for processing an impedance anomaly of a charging loop according to an embodiment of the present disclosure. In at least one embodiment, the method in FIG. 4 may be performed by the power adapter shown in FIG. 2, which is not described in detail here to avoid duplication. The method in FIG. 4 includes the following.

In block 410, the power adapter detects an output voltage of the power adapter when the power adapter charges the terminal.

In block 420, the power adapter sends voltage indication information to the terminal, in which the voltage indication information indicates the output voltage of the power adapter detected by the power adapter.

In block 430, the power adapter receives charging protection indication information from the terminal if the terminal determines that an impedance of the charging loop is abnormal based on a difference between an input voltage of the power adapter and the output voltage of the power adapter.

In block 440, the power adapter controls the charging loop to enter into a protected state according to an indication of the charging protection indication information.

In embodiments of the present disclosure, the power adapter communicates with the terminal during charging, and sends the output voltage of the power adapter detected by itself to the terminal, so that the terminal determines whether the impendence of the charging loop is abnormal according to the difference between the output voltage of the power adapter and the input voltage of the power adapter detected by itself. If the impendence of the charging loop is abnormal, the power adapter receives the charging protection indication information from the terminal and then controls the charging loop to enter into the protected state, thereby improving the security during charging.

In an embodiment, the charging interface includes a power wire and a data wire, and the power adapter charges the terminal via the power wire in the charging interface; the power adapter sending the voltage indication information to the terminal includes: the power adapter sending the voltage indication information to the terminal via the data wire in the charging interface.

In an embodiment, detection positions of the input voltage of the power adapter and the output voltage of the power adapter are located at two terminals of the charging interface respectively, and the impedance of the charging loop refers to an impedance of a circuit in the charging interface.

In an embodiment, a detection position of the input voltage of the power adapter is located at two terminals of a battery of the terminal, and the impedance of the charging loop refers to an impedance of a circuit from the power adapter to the battery of the terminal.

In an embodiment, the method in FIG. 4 further includes: generating an alarm signal if the impedance of the charging loop is abnormal.

Those skilled in the art may be aware that, in combination with the examples described in the embodiments disclosed in this specification, units and algorithm steps can be implemented by electronic hardware, or a combination of computer software and electronic hardware. Whether the functions are executed by hardware or software depends on particular applications and design constraint conditions of the technical solutions. Persons skilled in the art may use different methods to implement the described functions for each particular application, but it should not be considered that the implementation goes beyond the scope of the present invention.

It would be appreciated by those skilled in the art that, for the purpose of simplification convenience of description, concerning the specific working process of the above system, device and unit as described above, reference is made to the method embodiments of the present disclosure, which will not be elaborated herein.

In several embodiments provided in the application, it should be understood that the disclosed system, device and method can be realized by other manners. For example, the above-described embodiments are only exemplary; for example, the division of said unit is only a logic function division; there may be additional dividing manners during the actual implementation. For example, multiple units or components may be combined or integrated into another system, or some features can be ignored, or not implemented. Another point, the displayed or discussed mutual coupling or direct coupling or communication connection may be indirect coupling or communication connection of devices or units via some interfaces, in electronic, mechanical, or other forms.

Said unit described as a separation part may be or may not be separated physically; the part displayed as a unit may be or may not be a physical unit, namely it can be located in one place, or can be distributed to multiple network units. Part or all of the units can be selected according to actual needs to achieve the purpose of the embodiment.

In addition, all functional units in the embodiments of the invention can be integrated in one processing unit, or each unit exists individually in physical form, or two or more units are integrated in one unit.

If said function is realized in the form of software function unit and sold or used as an independent product, it can be stored in a computer readable storage medium. With such an understanding, the technical solution of the invention substantially or its portion that contributes to the prior art or a portion of the technical solution may embody in the form of a computer software product which is stored in a memory media, including a plurality of instructions such that a computer (may be a personal computer, a server, or a network device, etc.) executes all or some steps of the methods described in each of all the embodiments. And the previously mentioned memory media include such media capable of storing program codes as USB flash disk, portable hard drive, read-only memory (ROM), random access memory (RAM), floppy disk or compact disk.

The above descriptions are only specific embodiments of the invention, but not intended to limit the protection scope of the invention. The variation or replacement easily thought of by those of skill in the art within the technical scope disclosed by the invention, shall fall within the protection scope of the invention. Therefore, the protection scope of the invention shall be determined with reference to the protection scope of the claims.

What is claimed is:

1. A terminal, comprising:
   a communication component, configured to receive voltage indication information from a power adapter when the power adapter charges a battery of the terminal, the voltage indication information indicating an output voltage of the power adapter which is output to a charging interface by the power adapter;
   a detection component, configured to detect an input voltage of the power adapter which is received by the terminal from the power adapter via the charging interface; and
   an anomaly processing component, configured to:
   determine whether an impedance of a charging loop is abnormal according to a difference between the input voltage and the output voltage, and to control the charging loop to enter into a protected state when the impedance of the charging loop is abnormal, the charging loop being formed between the terminal and the power adapter via a charging interface to charge the battery;
   wherein, the communication component is configured to send charging protection indication information to the power adapter when the impedance of the charging loop is abnormal, so as to instruct the power adapter to control the charging loop to enter into the protected state.

2. The terminal according to claim 1, wherein, detection positions of the input voltage of the power adapter and the output voltage of the power adapter are located at two terminals of the charging interface respectively, and the impedance of the charging loop refers to an impedance of a circuit in the charging interface.

3. The terminal according to claim 1, wherein, a detection position of the input voltage of the power adapter is located at two terminals of the battery of the terminal, and the impedance of the charging loop refers to an impedance of a circuit from the power adapter to the battery of the terminal.

4. The terminal according to claim 2, wherein when the detection positions of the input voltage of the power adapter and the output voltage of the power adapter are located at two terminals of the charging interface respectively, the anomaly processing component is configured to determine that the impedance of the charging loop is abnormal when a voltage drop between the input voltage and the output voltage is abnormal.

5. The terminal according to claim 1, further comprising:
   an alarm device, configured to generate an alarm signal if the impedance of the charging loop is abnormal.

6. The terminal according to claim 1, wherein, the charging interface comprises a power wire and a data wire,
   the terminal is configured to form the charging loop with the power adapter via the power wire in the charging interface to charge the battery;
   the communication component is configured to receive the voltage indication information from the power adapter via the data wire in the charging interface.

7. The terminal according to claim 1, wherein the anomaly processing component is configured to control the charging loop to enter into the protected state by performing one or more of following operations of: reducing the input voltage of the power adapter; reducing an input current of the power adapter; and switching off the charging loop.

8. The terminal according to claim 1, wherein the charging interface is one of a USB interface and a micro USB interface.

9. A power adapter, comprising:
   a detection component, configured to detect an output voltage of the power adapter when the power adapter charges a battery of a terminal, the output voltage of the power adapter being a voltage output to a charging interface by the power adapter;
   a communication component, configured to send voltage indication information to the terminal, the voltage indication information indicating the output voltage of the power adapter detected by the detection component, and to receive charging protection indication information from the terminal when the terminal determines that an impedance of a charging loop is abnormal based on a difference between an input voltage of the power adapter and the output voltage of the power adapter, the charging protection indication information being configured to instruct the power adapter to control the charging loop to enter into a protected state, the charging loop is formed between the power adapter and the terminal via a charging interface to charge the battery, the input voltage of the power adapter being a voltage received by the terminal from the power adapter via the charging interface; and
   an anomaly processing component, configured to control the charging loop to enter into the protected state according to an indication of the charging protection indication information.

10. The power adapter according to claim 9, wherein, the charging interface comprises a power wire and a data wire,
    the power adapter comprises a power conversion component configured to form the charging loop with the terminal via the power wire in the charging interface to charge the battery of the terminal;

the communication component is configured to send the voltage indication information to the terminal via the data wire in the charging interface.

11. The power adapter according to claim 9, wherein, detection positions of the input voltage of the power adapter and the output voltage of the power adapter are located at two terminals of the charging interface respectively, and the impedance of the charging loop refers to an impedance of a circuit in the charging interface.

12. The power adapter according to claim 9, wherein, a detection position of the input voltage of the power adapter is located at two terminals of the battery of the terminal, and the impedance of the charging loop refers to an impedance of a circuit from the power adapter to the battery of the terminal.

13. The power adapter according to claim 10, wherein when the detection positions of the input voltage of the power adapter and the output voltage of the power adapter are located at two terminals of the charging interface respectively, the anomaly processing component is configured to determine that the impedance of the charging loop is abnormal when a voltage drop between the input voltage and the output voltage is abnormal.

14. The power adapter according to claim 9, further comprising:
an alarm device, configured to generate an alarm signal if the impedance of the charging loop is abnormal.

15. A method for processing an impedance anomaly of a charging loop, comprising:
receiving, by a terminal, voltage indication information from a power adapter when the power adapter charges the terminal, the voltage indication information indicating an output voltage of the power adapter which is output to a charging interface by the power adapter;
detecting, by the terminal, an input voltage of the power adapter which is received by the terminal from the power adapter via the charging interface; and
determining, by the terminal, whether an impedance of the charging loop is abnormal according to a difference between the input voltage and the output voltage,
controlling, by the terminal, the charging loop to enter into a protected state when the impedance of the charging loop is abnormal;
sending, by the terminal, charging protection indication information to the power adapter when the impedance of the charging loop is abnormal, so as to instruct the power adapter to control the charging loop to enter into the protected state.

16. The method according to claim 15, wherein, detection positions of the input voltage of the power adapter and the output voltage of the power adapter are located at two terminals of a charging interface respectively, and the impedance of the charging loop refers to an impedance of a circuit in the charging interface.

17. The method according to claim 15, wherein, a detection position of the input voltage of the power adapter is located at two terminals of a battery of the terminal, and the impedance of the charging loop refers to an impedance of a circuit from the power adapter to the battery of the terminal.

18. The method according to claim 15, further comprising:
generating, by the terminal, an alarm signal if the impedance of the charging loop is abnormal.

19. The method according to claim 16, wherein, the charging interface comprises a power wire and a data wire, the power adapter charges the terminal via the power wire,
receiving, by the terminal, the voltage indication information from the power adapter, comprises:
receiving, by the terminal, the voltage indication information from the power adapter via the data wire in the charging interface.

20. A method for processing an impedance anomaly of a charging loop, comprising:
detecting, by a power adapter, an output voltage of the power adapter when the power adapter charges a terminal, the output voltage of the power adapter being a voltage output to a charging interface by the power adapter;
sending, by the power adapter, voltage indication information to the terminal, the voltage indication information indicating the output voltage of the power adapter detected by the power adapter;
receiving, by the power adapter, charging protection indication information from the terminal when the terminal determines that an impedance of the charging loop is abnormal based on a difference between an input voltage of the power adapter and the output voltage of the power adapter, the charging protection indication information being configured to instruct the power adapter to control the charging loop to enter into a protected state, the input voltage of the power adapter being a voltage received by the terminal from the power adapter via the charging interface; and
controlling, by the power adapter, the charging loop to enter into the protected state according to an indication of the charging protection indication information.

* * * * *